United States Patent Office 3,040,006
Patented June 19, 1962

---

3,040,006
CYANO ESTERS OF ACIDIC COPOLYMERS
Robert J. Slocombe and Joseph E. Fields, Dayton, Ohio, assignors to Monsanto Chemical Company, St. Louis, Mo., a corporation of Delaware
No Drawing. Filed Dec. 30, 1957, Ser. No. 705,791
9 Claims. (Cl. 260—78.5)

This invention relates to copolymers and more particularly provides new and valuable cyano ether esters of certain acidic copolymers, the process of preparing the same, and hard, rubbery products prepared by vulcanization of said cyano esters.

According to the invention, there are provided polymeric esters which contain a plurality of units having the formula $$-Z-CH-CH-$$
$$\phantom{-Z-}O=C\phantom{xx}C=O$$
$$NC \cdot CH_2CH_2-(O-R)_n-O\phantom{xx}O-(RO)_n-CH_2CH_2 \cdot CN$$

in which Z and R are alkylene radicals of from 2 to 4 carbon atoms and $n$ is a number of from 1 to 3. They are prepared by esterifying a $C_2$–$C_4$ alkene-maleic anhydride copolymer consisting of the repeating unit

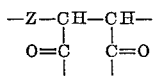

with an appropriate (hydroxyalkyleneoxy)propionitrile, i.e., a cyano ether alcohol of the formula $$HO-(R-O)_n-CH_2CH_2CN$$

wherein R and $n$ are as herein defined.

Examples of presently useful cyano ether alcohols are the 2-(2-hydroxyethoxy)propionitrile which is obtainable from ethylene glycol and acrylonitrile; the 2-(2-hydroxypropoxy)propionitrile obtainable from propylene-1,2-glycol and acrylonitrile; the 2-(2-hydroxy-1-methylpropoxy)-propionitrile obtainable from 2,3-butylene glycol and acrylonitrile; the 2-[2-(2-hydroxyethoxy)ethoxy]propionitrile obtainable by reaction of diethylene glycol and acrylonitrile; the hydroxy polyalkoxy-alkylene nitriles obtainable by reaction of such polyglycols as triethylene glycol or tripropylene glycol with acrylonitrile; the 4-(2-cyanoethoxy)-1-butanol obtainable from 1,4-butanediol and acrylonitrile; the 3-(2-cyanoethoxy)-1-propanol obtainable from 1,3-propanediol and acrylonitrile, etc.

The $C_2$–$C_4$ alkene-maleic anhydride copolymers which are esterified with the above cyano ether alcohols according to the invention are well-known articles to the art. They are generally prepared by reacting ethylene, propylene, 1- or 2-butene or mixtures of these olefins with maleic anhydride in the presence of a peroxide catalyst in an inert liquid medium which is a solvent for the monomeric olefin and the monomeric anhydride but is a non-solvent for the copolymer formed. Suitable solvents include benzene, toluene, xylene, chlorinated benzene, ethylene dichloride and the like. While benzoyl peroxide is generally the preferred catalyst, other peroxides such as acetyl peroxide, butyryl peroxide, di-tert-butyl peroxide, lauroyl peroxide, cumene hydroperoxide and the like are all satisfactory since they are soluble in the customarily employed solvents. The copolymer contains substantially equimolar quantities of the aliphatic mono-olefin residue and the maleic anhydride residue. The properties of the polymer such as molecular weight, for example, may be regulated by proper choice of the catalyst and control of one or more of the variables such as ratio of reactants, temperature, and catalyst concentration. The product is obtained in solid form and is easily recovered by filtration, centrifugation, or the like. Removal of any residual or adherent solvent may be effected by evaporation using moderate heating.

One class of the presently provided polymeric cyano ether esters includes those of ethylene-maleic anhydride copolymer. Such esters contain a plurality of units having the formula

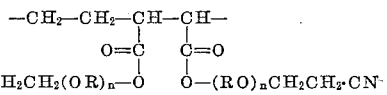

wherein R is an alkylene radical of from 2 to 4 carbon atoms and $n$ is a number of from 1 to 3. Examples of polymeric esters comprising units of the above formula and provided by the invention are the 2-(2-cyanoethoxy)-ethyl ester prepared by esterification of ethylene-maleic anhydride with 2-(2-hydroxyethoxy)propionitrile, the 3-(2-cyanoethoxy)propyl ester prepared by esterification of said anhydride copolymer with 2-(3-hydroxypropoxy)propionitrile, the 2-[2-(2-cyanoethoxy)ethoxy]ethyl ester prepared by esterification of said anhydride copolymer with 2 - [2 - (2-hydroxyethoxy)ethoxy]propionitrile, the 1-(2-cyanoethoxy)-2-propyl ester prepared by esterification of said anhydride copolymer with 2-(2-hydroxypropoxy)propionitrile, the 4-(2-cyanoethoxy)butyl ester prepared by esterification of said anhydride copolymer with 2-(4-hydroxybutoxy)propionitrile, the ester prepared from said anhydride copolymer and the saturated nitrile obtained by the addition reaction of acrylonitrile and triethylene glycol, etc. Particularly valuable are the 2-(2-cyanoethoxy)alkyl esters of ethylene-maleic anhydride copolymer wherein the alkyl radical has from 2 to 4 carbon atoms.

Another class of presently provided polymeric cyano ether esters includes those of propylene-maleic anhydride copolymers. Such esters contain a plurality of units having the formula

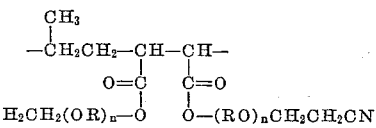

Examples of presently provided polymeric esters comprising units of the above formula are the 2-(2-cyanoethoxy)ethyl or the 2-[2-(2-cyanoethoxy)ethoxy]ethyl ester of propylene-maleic anhydride copolymer.

Still another class of presently provided polymeric, cyano ether esters includes those of 1-butene-maleic anhydride copolymer, e.g., the 3-(2-cyanoethoxy)ethyl or the 3-[3-(2-cyanoethoxy)propoxy]propyl ester.

Preparation of the present cyano ether esters of the $C_2$–$C_4$ alkene-maleic anhydride copolymers is effected by simply contacting the hydroxy nitrile with the anhydride copolymer or the free acid obtained therefrom by hydrolysis, in the presence of an esterifying catalyst, until formation of said esters has occurred. Advantageously, refluxing temperatures of the reaction mixture are employed. The present cyano ether esters may also be prepared by ester interchange, whereby a known ester of the copolymer, e.g., a lower alkyl ester of ethylene-maleic anhydride copolymer is reacted with the hydroxy nitrile. When working with either the anhydride copolymer or the corresponding free acid, it is advantageous, for easy removal of reaction water, to effect the esterification in the presence of a solvent which has the property of forming an azeotrope with water, e.g., toluene or xylene. Completion of the reaction can be generally ascertained by noting cessation in evolution of water. Subsequent manipulation of the reaction mixture depends upon the nature of initial materials employed and upon the uses to which the product is to be put. In many instances, the crude reaction mixture may be used directly without removing therefrom such possible constituents as esterifying catalyst, unreacted acid or hydroxy nitrile, etc. When a substantially pure product is desired, however, the crude reaction product may be treated with aqueous acid or base in order to wash out the catalyst. As catalysts in the esterification reaction, there may be used organic or inorganic acidic or basic materials such as sulfuric acid, hydrochloric acid, benzenesulfonic acid, potassium hydroxide, sodium acetate, sodium methoxide, etc.

The present polymeric cyano ether esters are rubbery products which can be compounded with the well-known fillers such as carbon black, zinc oxide and the like, vulcanization agents such as sulfur, para-quinone dioxime, polymeric dinitrosobenzene, amines, and the like to produce upon curing, molding or extruding, hard rubbery products of very good mechanical strength, thermal-stability and solvent-resistance. Vulcanized products provided by the present invention are of particular utility in the fabrication of molded products designed for use in the automotive and aeroplane industries wherein there is required high resistance against hydrocarbon oils and greases, phosphate-base functional fluids, etc.

The invention is further illustrated, but not limited, by the following examples.

Example 1

A mixture consisting of 20 g. of an ethylene-maleic anhydride copolymer having a specific viscosity of 0.342 as determined for a 1% solution thereof in dimethylformamide at 25° C., 110 g. of 2-(2-hydroxyethoxy)propionitrile, 100 g. of xylene and 0.5 g. of 4-toluenesulfonic acid was heated, with stirring, for 3 hours at a temperature of 139° C. At the end of that time, the resulting reaction mixture was diluted with ethanol (200 ml.) and the resulting mixture poured into additional ethanol in order to precipitate the product. Filtration gave the rubbery 2-(2-cyanoethoxy)ethyl ester of the ethylene-maleic anhydride copolymer. When dried on mill rolls under full steam, a very short rubbery product was obtained.

Example 2

A mixture consisting of 20 g. of the ethylene-maleic anhydride copolymer described in Example 1, 150 ml. of 2-(2-hydroxyethoxy)propionitrile and 0.5 g. of toluenesulfonic acid was heated to 115° C., and 40 ml. of chlorobenzene was added to the heated mixture. The temperature of the whole was brought to 190° C. and it was maintained at this point for 3 hours. At the end of that time, it was allowed to cool and diluted with ethanol. Drying of the rubbery product which precipitated therefrom gave a short rubber which was readily molded to a flexible test specimen at a temperature of 180–190° C. and a pressure of 2,000 p.s.i. The cooled product was not affected even after 2.5 days at 90° C. by a phosphate-base functional fluid known to the trade as "Skydrol" and characterized at p. 218 of the book by O. T. Zimmerman and Irvin Lavine, "Handbook of Material Trade Names, Supplement I to the 1953 Edition," published by Industrial Research Service, Inc., Dover, New Hampshire, 1956.

Example 3

A mixture consisting of 30 g. of an ethylene-maleic anhydride copolymer having a specific viscosity of 0.630 as determined for a 1.0% solution thereof in dimethylformamide at 25° C., 200 ml. of 2-(2-hydroxyethoxy)-propionitrile and 1 g. of toluenesulfonic acid was maintained at a temperature of 136° C. during a period of 3 hours, while adding a total of 200 ml. of chlorobenzene to the heated mixture. During this time, 2 ml. of water was collected in the trap which formed a part of the reaction equipment. Subsequently 150 ml. of xylene was added, heating was continued for another 3 hours to a temperature of 138° C., 5 ml. of cyclohexylamine was added and the whole was heated for an additional hour. Upon cooling the reaction mixture and pouring it into ethanol, a rubbery product precipitated therefrom which upon vacuum drying at 50° C., gave the hard, rubbery 2-(2-cyanoethoxy)ethyl ester of the ethylene-maleic anhydride copolymer.

Example 4

A mixture consisting of 30 g. of the ethylene-maleic anhydride copolymer described in Example 1, 150 ml. of 2-(2-hydroxyethoxy)propionitrile, and 1 g. of toluenesulfonic acid was heated to a temperature of 168° C. and addition of 90 ml. of chlorobenzene in increments was initiated and maintained over a period of 45 minutes at a temperature of from 168–196° C. Heating was then continued for another 10 minutes, and the resulting thickened reaction mixture was diluted by gradual addition of xylene during a period of 4.5 hours at a temperature of ca. 180° C. A total of 250 ml. of xylene was used. To the reaction mixture there was then added 250 ml. of ethanol and the whole poured into 2 liters of ethanol. The precipitated rubber was thoroughly masticated in the ethanol and dried in vacuum at 60° C. to give 54 g. of hard, rubbery crumbs of the 2-(2-cyanoethoxy)ethyl ester of the ethylene-maleic anhydride copolymer.

Example 5

A mixture consisting of 30 g. of the ethylene-maleic anhydride copolymer described in Example 1, 250 ml. of 2-(2-hydroxyethoxy)propionitrile and 1 g. of toluenesulfonic acid was heated to 90° C. at which point 50 ml. of chlorobenzene was added and the whole heated at 190–205° C. for one hour. During this period, 4 ml. of water was collected in the trap which formed a part of the reaction equipment. To the resulting gelled reaction mixture, there was then added 150 ml. of xylene and heating was continued for an additional 5 hours at a temperature of 141° C. Upon cooling, the reaction mixture was poured into ethanol, and the precipitated rubbery product was filtered off and dried in vacuum at a temperature of 50° C. to give 47 g. of the rubbery 2-(2-cyanoethoxy)ethyl ester of the ethylene-maleic anhydride copolymer.

Example 6

The polymer of Example 5 was compounded on cold rolls as follows:

| | Parts by weight |
|---|---|
| Polymer | 10 |
| Carbon black | 3 |
| Lead oxide | 1.5 |
| Polyac accelerator [1] | 0.25 |

[1] A commercially available product consisting of 30% p-dinitrosobenzene polymer and 70% inert mineral filler.

Curing of the resulting mixture for 10 minutes at 140° C. and 300 p.s.i., with a cooling pressure of 600 p.s.i., gave a hard, rubbery sheet which was neither swollen nor attacked after immersion for 3 days at a temperature of 95° C. in a phosphate-base functional fluid known as "Skydrol."

In another experiment, the polymer of Example 4 was compounded on cold rolls as follows:

| | Parts by weight |
|---|---|
| Polymer | 100 |
| Carbon black | 30 |
| Zinc oxide | 5 |
| Santoflex B | 2 |
| p-Quinone dioxime | 5 |
| Red lead | 5 |
| Stearic acid | 3 |

The hard, rubbery product obtained from curing the compounded mixture was resistant to the phosphate-base functional fluid "Skydrol" and to refluxing xylene.

What we claim is:

1. A rubbery product prepared by diesterifying (1)

anhydride groups of the normally solid copolymer of substantially equimolar proportions of maleic anhydride and an alkene of from 2 to 4 carbon atoms with (2) a hydroxyalkoxynitrile of the formula $$HO\text{—}(R\text{—}O)_n CH_2 CH_2 CN$$

in which $n$ is a number of from 1 to 3 and R is an alkylene radical of from 2 to 4 carbon atoms, the esterifying being conducted by heating the copolymer with the hydroxyalkoxynitrile.

2. A rubbery product prepared by diesterifying (1) anhydride groups of the normally solid copolymer of substantially equimolar proportions of maleic anhydride and ethylene with (2) a hydroxyalkoxynitrile of the formula $HO\text{—}(R\text{—}O)_n CH_2 CH_2 CN$ in which $n$ is a number of from 1 to 3 and R is an alkylene radical of from 2 to 4 carbon atoms, the esterifying being conducted by heating the copolymer with the hydroxyalkoxynitrile.

3. A rubbery product prepared by diesterifying, with 2-(2-hydroxyethoxy)propionitrile, anhydride groups of the normally solid copolymer of substantially equimolar proportions of maleic anhydride and an alkene of from 2 to 4 carbon atoms, the esterifying being conducted by heating the copolymer with the 2-(2-hydroxyethoxy)propionitrile.

4. A rubbery product prepared by diesterifying, with 2-(2-hydroxyethoxy)propionitrile, anhydride groups of the normally solid copolymer of substantially equimolar proportions of maleic anhydride and ethylene, the esterifying being conducted by heating the copolymer with the 2-(2-hydroxyethoxy)propionitrile.

5. A hard, vulcanized rubber prepared by heating the product defined in claim 1 with a vulcanizing agent selected from the class consisting of sulfur, para-quinone dioxime and dinitrosobenzene polymer.

6. A hard, vulcanized rubber prepared by heating the product defined in claim 1 with para-quinone dioxime.

7. A hard, vulcanized rubber prepared by heating the product defined in claim 1 with dinitrosobenzene polymer.

8. A hard, vulcanized rubber prepared by heating the product defined in claim 4 with para-quinone dioxime.

9. A hard, vulcanized rubber product prepared by heating the product defined in claim 4 with p-dinitrosobenzene polymer.

References Cited in the file of this patent

UNITED STATES PATENTS

| | | |
|---|---|---|
| 2,047,398 | Voss et al. | July 14, 1936 |
| 2,380,061 | Mowry | July 10, 1945 |
| 2,436,256 | Hanford et al. | Feb. 17, 1948 |
| 2,570,846 | Otto et al. | Oct. 9, 1951 |
| 2,583,327 | D'Alelio | Jan. 22, 1952 |
| 2,669,558 | Mowry | Feb. 16, 1954 |
| 2,687,402 | Wesp et al. | Aug. 24, 1954 |
| 2,694,685 | Barlett | Nov. 16, 1954 |
| 2,720,512 | Butler | Oct. 11, 1955 |
| 2,824,852 | Kern | Feb. 25, 1958 |

FOREIGN PATENTS

| | | |
|---|---|---|
| 159,360 | Australia | Oct. 18, 1954 |